United States Patent [19]

Featherstone et al.

[11] Patent Number: 5,572,837

[45] Date of Patent: Nov. 12, 1996

[54] PNEUMATIC TELESCOPING MAST

[75] Inventors: Harry E. Featherstone; Dennis B. Donahue, both of Wooster, Ohio

[73] Assignee: The Will-Burt Company, Orrville, Ohio

[21] Appl. No.: 286,269

[22] Filed: Aug. 5, 1994

[51] Int. Cl.⁶ .......................... E04H 12/18; E04H 12/34; F21V 21/22

[52] U.S. Cl. .................... 52/118; 52/115; 52/116; 362/385

[58] Field of Search ............................. 52/111, 115, 116, 52/117, 118, 119, 143; 182/63, 68; 362/385; 280/4; D12/13

[56] References Cited

U.S. PATENT DOCUMENTS

| | | | |
|---|---|---|---|
| 143,182 | 9/1873 | Pierson | 182/68 |
| 301,019 | 6/1884 | Teal | 52/118 |
| 456,382 | 7/1891 | McParland | 52/115 X |
| 713,911 | 11/1902 | McParland | 182/63 X |
| 722,552 | 3/1903 | Anderson | 182/63 X |
| 1,035,570 | 8/1912 | Gary et al. | 182/68 |
| 1,183,960 | 5/1916 | Ecker et al. | 182/68 |
| 1,261,112 | 4/1918 | Fay et al. | 52/116 X |
| 1,271,391 | 7/1918 | Trojan | 182/68 |
| 2,616,768 | 11/1952 | Stemm | 182/63 X |
| 3,296,757 | 1/1967 | Goodman . | |
| 4,337,560 | 7/1982 | Slysh . | |
| 4,413,451 | 11/1983 | Featherstone et al. . | |
| 4,566,714 | 1/1986 | De Witt et al. | 284/404 |
| 4,594,824 | 6/1986 | Zeigler et al. | 52/118 |
| 4,600,980 | 7/1986 | Dahlgren . | |
| 5,102,375 | 4/1992 | Featherstone . | |
| 5,107,672 | 4/1992 | Lehnert . | |
| 5,139,464 | 8/1992 | Lehnert . | |
| 5,168,679 | 12/1992 | Featherstone . | |
| 5,203,746 | 4/1993 | Lehnert . | |

FOREIGN PATENT DOCUMENTS

| | | |
|---|---|---|
| 0379335 | 7/1990 | European Pat. Off. . |
| 2592026 | 6/1987 | France . |
| 257063 | 2/1913 | Germany . |

OTHER PUBLICATIONS

European Search Report dated Nov. 15, 1995 for Application No. EP 95 11 2378.

*Primary Examiner*—Wynn E. Wood
*Assistant Examiner*—Laura A. Saladino
*Attorney, Agent, or Firm*—Vickers, Daniels & Young

[57] ABSTRACT

A pneumatically telescoping mast adapted for mounting an electrical fixture is disclosed. The telescoping mast includes a pneumatic control system to extend the mast from a retracted position to an extended position. The mast is made up of adjacent telescopic sections, each section slidable relative to an adjacent section, each section slidable between the retracted position and the extended position. Mechanical arrangements are disclosed for pivoting the mast between a generally horizontal and a generally vertical position, including drive mechanisms operable independently of the pneumatic control system and adapted to securely maintain the mast at any desired angle between the horizontal and vertical positions.

23 Claims, 7 Drawing Sheets

PNEUMATIC TELESCOPING MAST

The present invention relates to the art of pneumatically actuated telescoping masts and more particularly to an improved tilting mechanism to increase the adaptability of the telescoping mast. The invention is particularly applicable to pneumatically actuated telescoping masts used for positioning electrical devices.

INCORPORATION BY REFERENCE

Featherstone U.S. Pat. No. 4,413,451 is incorporated by reference herein so that pneumatically actuated telescoping masts known in the art need not be described in detail hereinafter.

BACKGROUND OF THE INVENTION

A pneumatically actuated telescoping mast is well known in the prior art and is generally of such a nature that it may be mounted readily on the roof of a vehicle. In such arrangement the mast is generally used for positioning electrical devices, particularly emergency lighting fixtures, and an elevated point above the vehicle. The effect is to immediately light a large area about the vehicle in order that emergency procedures can be conducted. Pneumatically actuated telescoping masts are particularly advantageous in such situations since they are light weight, compact in a retracted position and capable of being mounted on the roof of most emergency vehicles, including automobiles.

Pneumatically actuated telescoping masts have the further advantage of having full, open and unobstructed mast sections. These sections permit electrical wiring to pass within and through the telescopic tubular mast sections for controlling electrical devices or fixtures mounted on the mast. The electrical wiring does not interfere with or affect the pneumatic system or the air pressure required to extend and retract the mast. Thus, the electrical portions and component parts are completely housed within the mast and protected from the weather elements. Other problems associated with the storage and reeling out of external wire which is connected to the mast are also eliminated. The prior art pneumatically telescoping masts are extended using air under pressure and, in a fully extended position, are necessarily vertical. Pneumatically telescoping masts heretofore available are not capable of being maintained at a plurality of angles between a horizontal and vertical position. Indeed, the pneumatic masts have only two fixed positions, horizontal and vertical as seen in Featherstone U.S. Pat. No. 4,413,451. The pneumatic system used to inflate the mast in Featherstone is also used to pivot the mast between horizontal and vertical positions.

The pneumatic telescoping mast is specifically advantageous for use in emergency situations. The light weight feature enables the telescoping mast to be mounted on an emergency vehicle or automobile. However, the users of such pneumatic telescoping masts have long desired more versatility in the placement of a light at the top of the mast relative to the work area to be lighted. Police and other emergency personnel have realized that the existing light mounted on pneumatically telescopic mast would be more useful if it could be inclined relative to vertical and placed directly over the site to be lighted, instead of adjacent thereto. This would eliminate the problem of shadows cast by objects or people coming between the area desired to be lighted and the vehicle. Such shadows hinder the work of emergency personnel. For example, in certain situations, an emergency vehicle cannot immediately access an emergency site. In such situations, it would be advantageous to incline the light at an angle to the vehicle in order that the light beam can be directly placed over the emergency site. Due to the pneumatic telescoping feature, it has not been possible heretofore to place a pneumatic mast at a desired tilt angle in order to place a light or electrical receptacle mounted on the outer end of the mast directly over the emergency site where it is most needed. Such a tiltable pneumatic telescoping mast would be very desirable during rescue of persons in areas which are difficult to reach with an emergency vehicle, such as in a body of water, under a bridge or over the edge of a ravine.

Previous attempts at developing a tilt mechanism for a pneumatically telescoping mast have not proved successful. These attempts include a screw drive mechanism utilizing a ball nut and screw to manipulate the mast and thus the angle of the mast relative to the vehicle on which it is mounted. A screw drive mechanism adds a significant amount of weight to the roof of the vehicle and screw drive mechanisms are expensive and prone to malfunction. A screw drive mechanism is also subject to differing torque loads as the mast is raised and lowered. This also increases the wear on the screw drive, and thus the device requires frequent maintenance. Finally, some screw drive arrangements are structurally complex and thus more expensive and especially hard to repair, and usually require replacement as opposed to maintenance.

An alternative to a screw drive mechanism is a hydraulic system. While less expensive to maintain, the upfront capital costs of hydraulics add greatly to the overall costs of a pneumatic telescoping mast. Additionally, hydraulics, and their associated fluids add significant weight to the telescoping mast system. Finally, hydraulics also require a separate pressure and fluid flow system distinct from the air system used to inflate the mast. The dual systems which would be required would significantly add to the cost of a telescoping mast.

Both the screw drive mechanism and hydraulic system require additional space adjacent the telescoping mast. However, the dimensions of an emergency vehicle roof are not always large enough to accommodate a pneumatic mast with the aforementioned tilting mechanisms. The light bar atop an emergency vehicle presents additional clearance problems, and can further restrict the space available.

SUMMARY OF THE INVENTION

The present invention advantageously provides an improved pneumatically actuated telescoping mast which overcomes the disadvantages of prior art pneumatically actuated telescoping masts. The mast may be pivoted between a plurality of angles between the horizontal and vertical positions and securely maintained at any of such angles, increasing the versatility of use of the pneumatic telescoping mast without the prior art disadvantages.

More particularly in this respect, a partially or fully extended pneumatic telescoping mast is capable of being pivoted between generally horizontal and generally vertical positions. The pivoting is accomplished by an apparatus that is independently operable from the pneumatically extending system of the mast and utilizes a mechanical drive wheel and linkage interconnecting the drive wheel and the mast. Rotating the drive wheel pivots the mast through the linkage, and the drive wheel and linkage are cooperable to securely maintain the mast at any one of a plurality of angles between the horizontal and vertical position.

The present invention solves many of the prior art problems by providing a pneumatically operated telescoping mast which can place a utility light or other electrical device directly over the site at which it is required with a less complex and less expensive mechanical arrangement than heretofore available. Prior art shows pneumatics used to inflate the mast were also used to pivot the mast from a generally horizontal position, in which it is stored, to a generally vertical position, in which the mast is used. This meant that, for example, a light mounted at the upper end of the mast was positioned directly over the automobile or other support vehicle. Thus, optimum light intensity in an area laterally spaced from the vehicle was not attainable. As previously discussed, objects coming between the area desired to be lighted and the vehicle cast shadows obstructing the view of emergency personnel. Previous attempts to solve these problems with screw drive mechanisms or hydraulic systems create other drawbacks discussed hereinabove. The present invention advantageously eliminates these drawbacks without significantly adding to the overall size or weight of the pneumatically telescoping mast, provides accurate control of the tilt angle of the mast, is easy to maintain and is less expensive than alternative telescoping masts with the features desired. The present invention provides an improved pneumatically telescoping mast which can be inclined to provide light in locations directly overhead of the site which is to be illuminated and which is spaced from the vehicle. This presents a distinct advantage by eliminating shadows in restricted areas such as underneath bridges, over bodies of water or over ravines or other drop-offs.

In accordance with the present invention, a pneumatically telescoping mast supported for pivotable movement in opposite directions about a horizontal mast axis includes adjacent telescoping sections slidable relative to one another between retracted and extended positions. A pneumatic control system is provided for displacing the mast sections between the retracted and extended positions, and a pivoting mechanism is provided to pivot the mast in opposite directions about the pivot axis between horizontal and vertical positions. The pivoting mechanism basically includes a drive wheel and a linkage mechanism interconnecting the drive wheel and the mast for rotation of the drive wheel in one direction to pivot the mast toward the vertical position and for rotation of the drive wheel in the opposite direction to pivot the mast towards the horizontal position. Thus, prior to extension of the telescoping mast, during pneumatic extension of the telescoping mast or after the mast has been fully extended, the mast may be placed at any one of a plurality of tilt angles in order to access a site remote from the emergency vehicle. In conjunction therewith, and in a preferred embodiment, the telescoping mast is fitted with a pivotally mounted utility light which can directly shine on the remote access site regardless of the tilt angle of the mast.

It is thus, an outstanding object of the invention to provide an improved pneumatically telescoping mast which permits an electrical fixture such as a utility light to be directly placed over an access site not otherwise accessible by a vehicle.

It is yet another object of the invention is to provide an improved pneumatically telescoping mast which is capable of pivoting between a generally horizontal position and a generally vertical position, and wherein the pivoting does not operably rely on and is independently operable from the pneumatic control system used to extend the mast.

Still another object of the invention is to provide an improved pneumatically actuated telescoping mast which can be maintained at any desired tilt angle between the horizontal and vertical positions while the mast is in a retracted position, a fully extended position or some position therebetween.

Yet another object of the invention is to provide an improved pneumatically telescoping mast pivoting mechanism which utilizes less space, is easier to maintain and is less expensive than alternative pneumatically telescoping mast pivoting mechanisms.

These and other objects of the invention will become apparent to those skilled in the art upon reading and understanding the following detailed description of preferred embodiments.

BRIEF DESCRIPTION OF THE DRAWINGS

The invention may take physical form in certain parts and arrangement of parts, preferred embodiments of which will be described in detail and illustrated in the accompanying drawings which form a part hereof and wherein.

PREFERRED EMBODIMENTS

Figure 1:
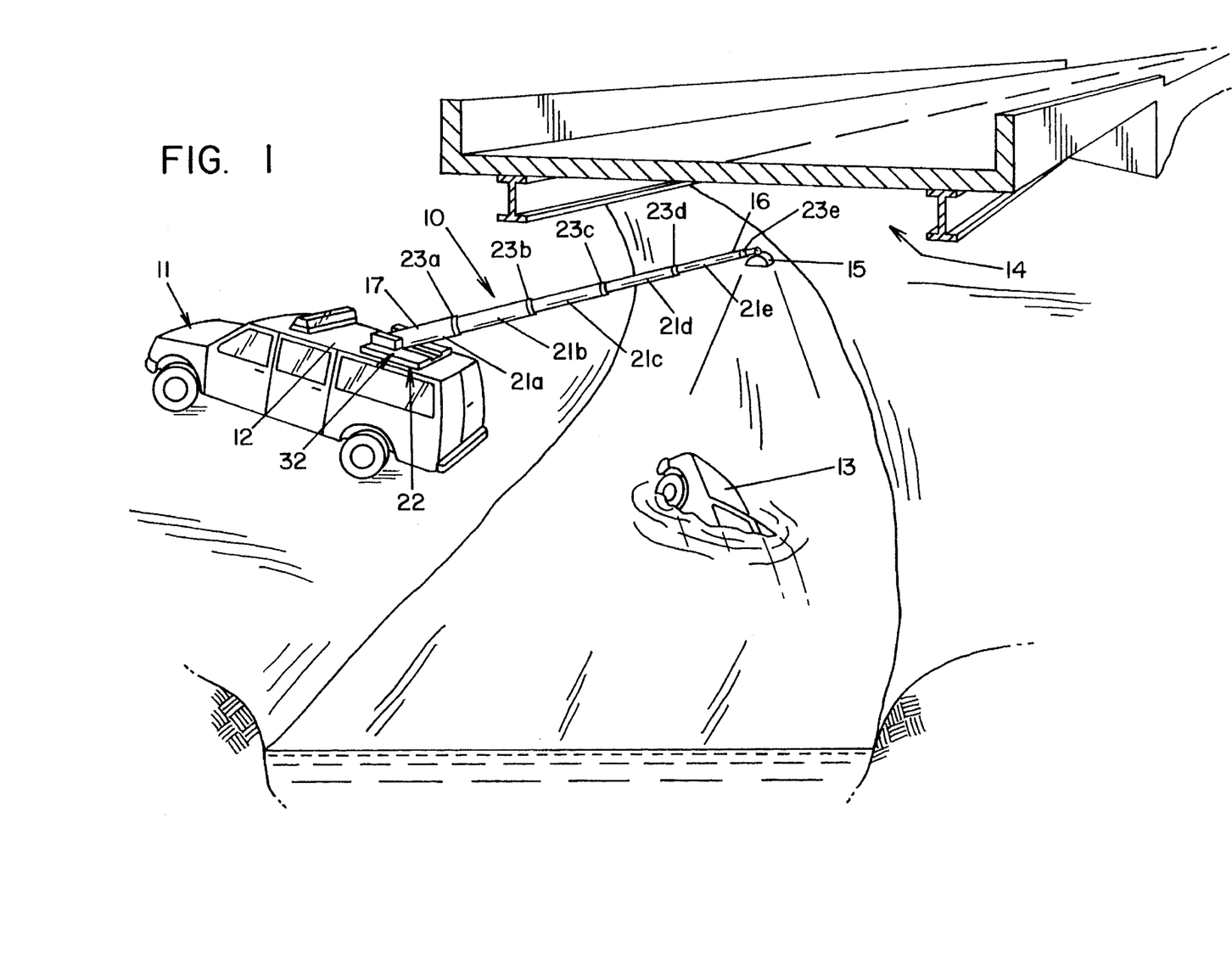
FIG. 1 is a pictorial view illustrating one use of the pneumatically telescoping mast of the present invention.

Referring to the drawings, wherein the showings are for the purpose of illustrating preferred embodiments of the invention only and not for the purpose of limiting same, FIG. 1 shows the pneumatically telescoping mast 10 of the present invention as mounted on an emergency vehicle 11. More particularly in this respect, telescoping mast 10 is mounted on the vehicle roof 12 of emergency vehicle 11 and is shown in a fully extended position. In accordance with the present invention, the mast is at a tilt angle between 0° and 90° where, for the purpose of this description, 0° is defined as being parallel with vehicle roof 12 and generally horizontal, while 90° is perpendicular to vehicle roof 12 and in a generally vertical position.

FIG. 1 shows one of the advantages of telescoping mast 10 of the present invention. As shown, an automobile 13 is trapped in water underneath a bridge 14. In order that emergency personnel may adequately view automobile 13 to aid in retrieving the vehicle, rescuing persons from the car or, indeed, to determine if any persons are present, telescoping mast 10, fitted with a utility light 15, is positioned over automobile 13. Utility light 15 is located adjacent the upper mast end 16. Since emergency vehicle 11 cannot directly access the site in the middle of the river, it is necessary that telescoping mast 10 be placed at some tilt angle beyond vehicle roof 12 which is not perpendicular to vehicle roof 12. Additionally, bridge 14 provides another obstruction under which telescoping mast 10 must be positioned. While it can extend horizontally, such position places light 15 too close to the ground or vehicle 13 to adequately light the site and furthermore, may position the mast such that the latter interferes with free movement of rescue workers at the emergency site. As will be clearly appreciated from FIG. 1, the prior art pneumatically telescoping mast, if vertical, would be inadequate to light the area surrounding automobile 13. The location of automobile 13 and the obstruction of bridge deck 14 would prevent the prior art pneumatic telescoping mast from adequately lighting the surrounding area to aid emergency personnel.

Figure 2:
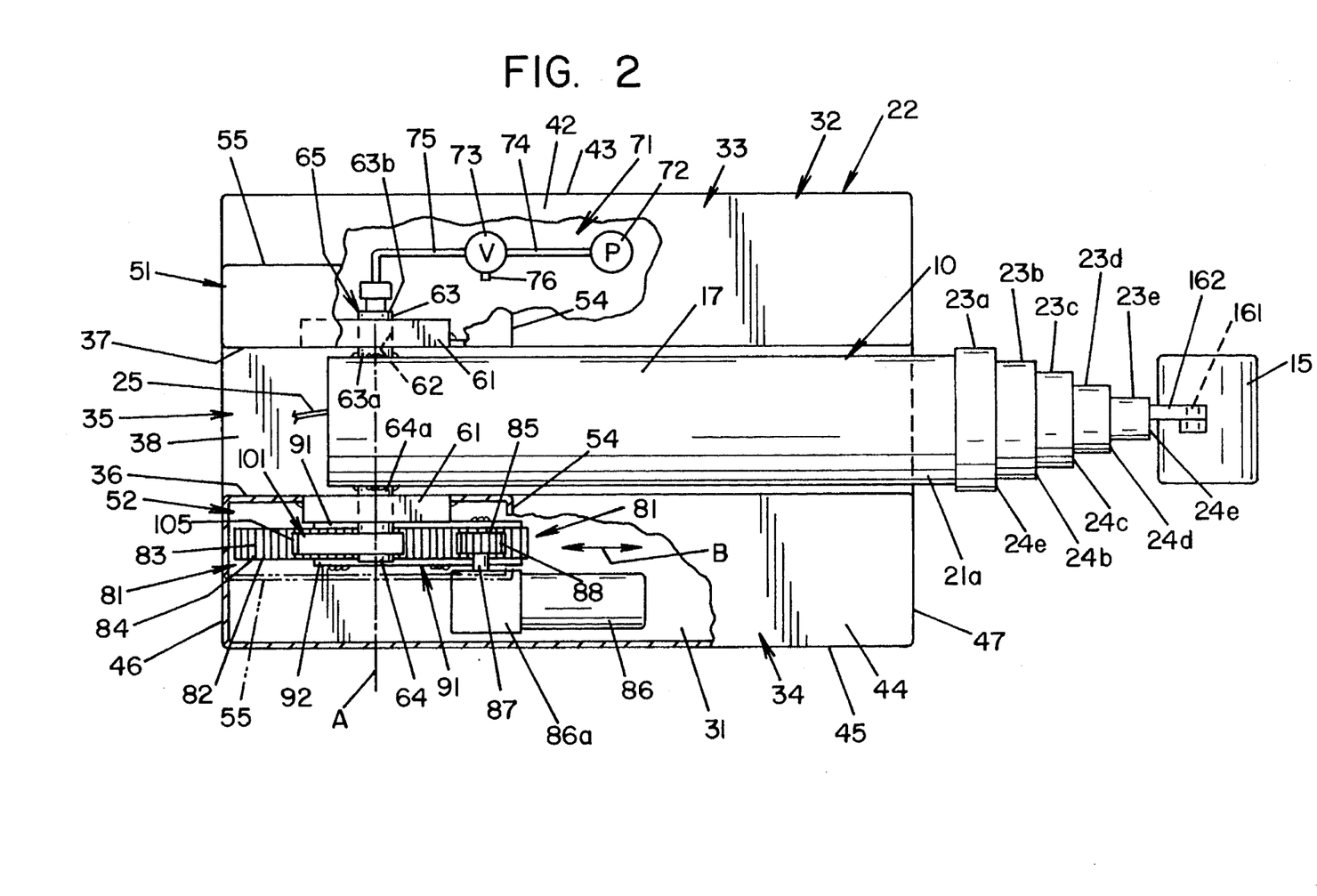
FIG. 2 is a plan view partially in section of one embodiment of the pneumatically telescoping mast.
Figure 3:
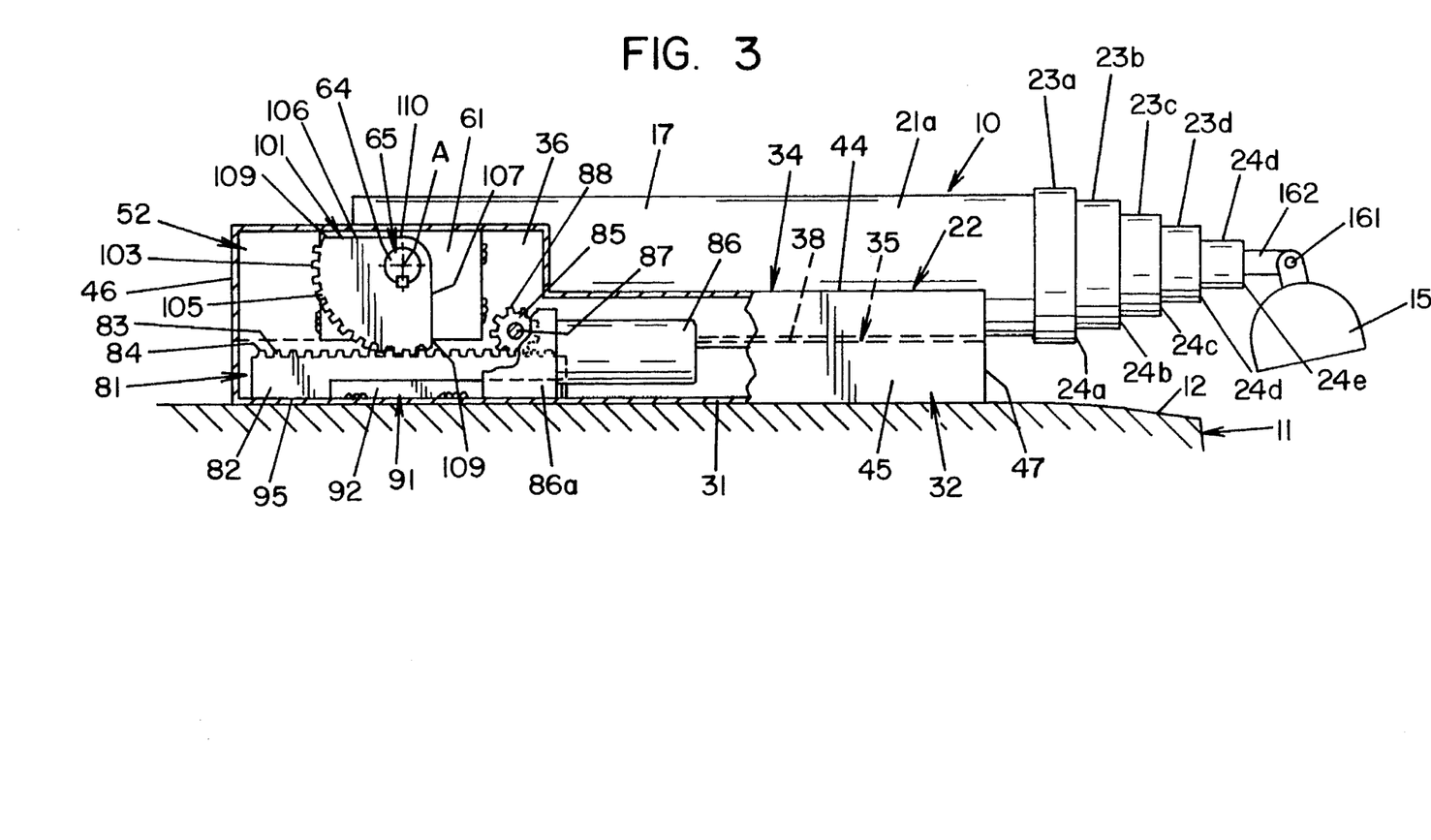
FIG. 3 is an elevation view partially in section of the telescoping mast of FIG. 2.

As best shown in FIGS. 2–5, pneumatically telescoping mast 10 is made up of individual telescoping sections 21a–21e. In the preferred embodiment telescoping section 21a is at the lower mast end 17 of mast 10 and is pivotally mounted to a base 22. Section 21a is a relatively rigid tubular section in comparison to telescoping sections 21b–21e. Sections 21a–21e include corresponding upper flange portions 23a–23e which provide a rigid upper end portion 24a–24e for each of telescoping sections 21a–21e. Such rigidity facilitates the pneumatic extension and retraction of telescoping mast 10. Each of the flange portions 23a–23e is in abutting relationship with an adjacent flange portion when telescoping mast 10 is in a retracted position. Upon extension of mast 10 each of individual sections 21b–21e is displaced and extends from the adjacent larger telescoping section as shown in FIG. 1. For example, telescoping section 21b is stored within telescoping section 21a while mast 10 is in a retracted state as shown in FIGS. 2 & 3. Upon extension, telescoping section 21b extends from within tubular telescoping section 21a. This process is repeated for telescoping sections 21c–21e. Sections 21a–21e are hollow tubular cylinders and permit extendable and retractable electrical cable 25 for light 15 to be located inside mast 10.

Base 22 includes mounting plate 31 which can be affixed to vehicle roof 12 by any one of a number of conventional fasteners including bolts or screws. Mounting plate 31 is fitted with an outer housing cover 32 divided into three sections, a pneumatic air section 33, a mechanical section 34 and a channel section 35 parallel to each of sections 33, 34 and disposed therebetween. Channel section 35 forms a central depression in which mast 10 is stored when in a retracted horizontal position as shown in FIGS. 2 and 3. Channel section 35 is comprised of the channel sidewalls 36, 37 and a channel bottom wall 38 upon which mast 10 rests when in its horizontal position.

Pneumatic air section 33 includes a top wall 42 generally parallel to mounting plate 31 and extending between channel side wall 37 and a longitudinal vertical side wall 43. Mechanical section 34 is the mirror image of pneumatic air section 33 and includes a top wall 44 generally parallel to mounting plate 31 and coplaner with top wall 42. Top wall 44 extends between channel side wall 36 and a longitudinal vertical side wall 45. Side walls 43 and 45 are generally parallel to each other. Extending between and connecting side walls 43, 45 are the transverse end walls 46, 47. Each of the end walls 46, 47 is generally perpendicular to side walls 43, 45.

Located within pneumatic air section 33 and mechanical air section 34 are the pillow block compartments 51, 52, respectively. Each of the pillow block compartments 51, 52 has a back end wall formed by transverse end wall 46. Opposite end wall 46 is a front end wall 54. Perpendicular to and extending between end wall 46 and the corresponding front end wall 54 is an outside edge wall 55 and channel side wall 36 for pillow block compartment 52 and channel side wall 37 for pillow block compartment 51. Each of the pillow block compartments 51, 52 has a bottom wall defined by mounting plate 31, and the pillow block compartments are open to pneumatic air section 33 and mechanical section 34.

Figure 4:
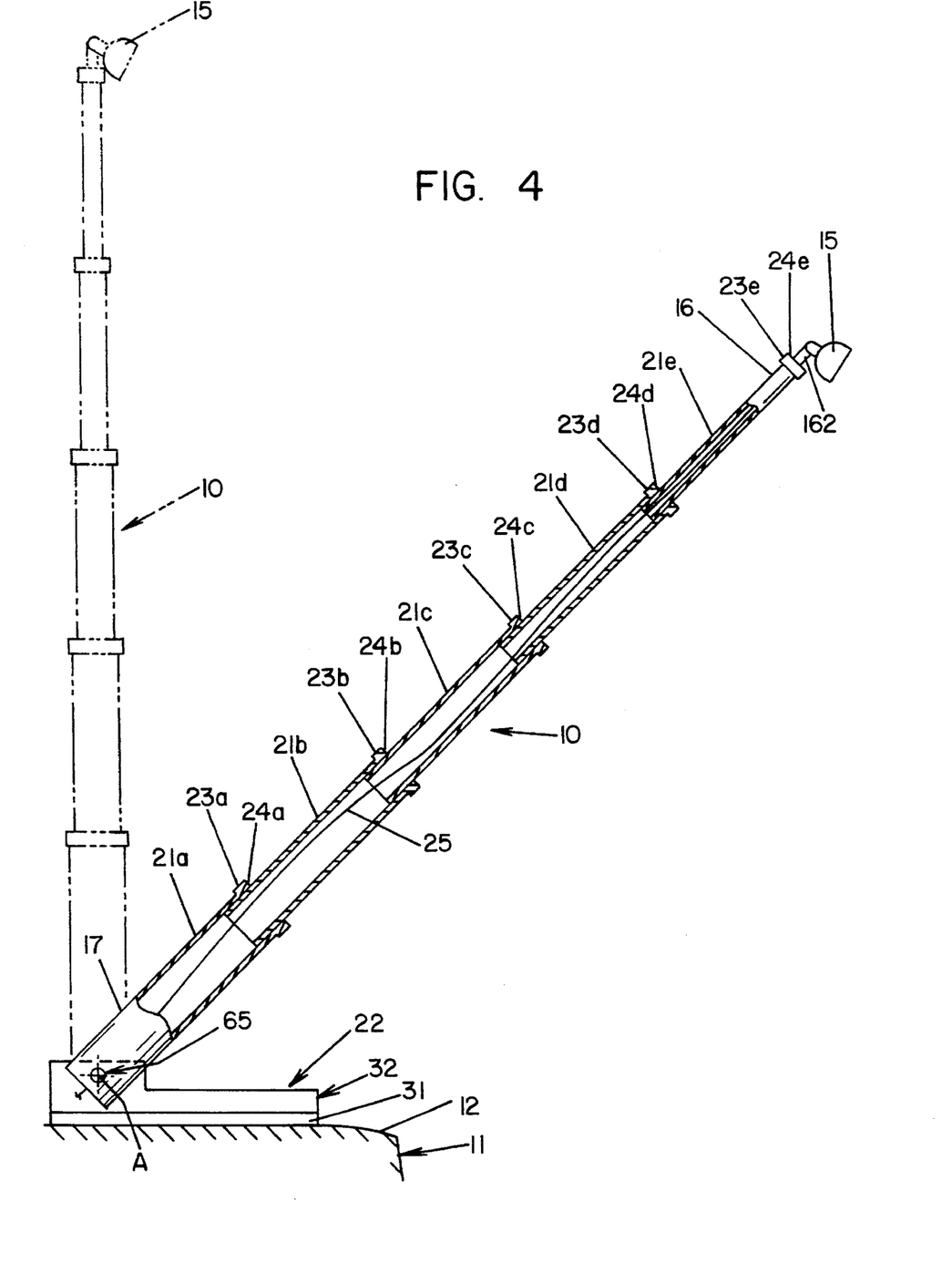
FIGS. 4 and 5 are elevation views, partially in section, somewhat schematically illustrating a pneumatically telescoping mast according to the invention, respectively, in the extended and retracted portions thereof.

Portions of channel side walls 36, 37 are cut away, and pillow blocks 61 are positioned in the cut away areas and welded in place. Pillow blocks 61 have a thickness substantially greater than side walls 36, 37 and are positioned to extend within pillow block compartments 51, 52 such that the inner surfaces thereof and of channel side walls 36, 37 facing telescoping mast 10 remains smooth and flush. Each of the pillow blocks 61 is provided with a pillow block opening 62. Within each opening 62 is a corresponding pivot pin 65 comprising the journal portions 63, 64 which are rotatably located within pillow block openings 62. Journal portion 63 is preferably a hollow cylinder, while journal portion 64 is a solid cylinder. Each of journal portions 63, 64 has a mast end 63a and 64a, respectively, each of which are attached to mast 10 at section 21a. Mast end 63a surrounds a hole in mast section 21a, not designated numerically, and which hole has a diameter approximately the same as the inside diameter of journal portion 63. Mast end 64a of journal portion 64 abuts section 21a. Both journal portions 63, 64 are welded in place to section 21a, thus providing a pivot axis A about which telescoping mast 10 can rotate between a relatively horizontal and a relatively vertical position. In order to actuate telescoping mast 10 between a retracted and an extended position, a pneumatic control system 71 is provided. Included in pneumatic control system 71 is air compressor 72 and three way solenoid valve 73 with air supply tube 74 disposed therebetween. Solenoid valve 73 includes a vent opening 76 for expelling air from the system. Pneumatic control system 71 operates like similar systems in the prior art. Compressor 72 passes air through air tube 74 and open solenoid valve 73 to air supply tube 75 which is connected to journal portion 63 at air supply end 63b where air enters telescoping mast 10 through hollow cylinder journal portion 63. As each telescoping section fills with air, telescoping sections 21a–21e extend into a position as shown in FIGS. 1 and 4. To exhaust air from telescoping mast 10, solenoid valve 73 is actuated to allow air from telescoping mast 10 to pass through air supply tube 75 whereupon it is expelled out vent opening 76. In the preferred embodiment pneumatic control system 71 is connected to the electrical system in vehicle 11 for actuating solenoid valve 73 and air compressor 72. However, it will be appreciated that an independent power supply may be used and mounted directly upon base 22. Alternatively, a manually operated air pump may be substituted for air compressor 72 and a manually operated valve substituted for solenoid valve 73 in order than telescoping mast 10 may be operated where no power supply system is present. Pneumatic control system 71 is housed within pneumatic air section 33 and pillow block compartment 51.

FIGS. 2 and 3 shows one embodiment of the invention for pivoting telescoping mast 10 between a generally horizontal position and a generally vertical position. Contained within mechanical section 34 and pillow block compartment 52 is a rack and pinion system 81. Included within rack and pinion system 81 is a rack 82 having gear teeth 83 on an upper face 84 for interengaging a pinion 85 which is driven by a motor 86 through a gearbox 86a. As pinion 85 is rotated by gearbox shaft 87, rack 82 slides back and forth in the directions shown by arrow B. Rack 82 slides within a track 91 formed by plates 92, 93 welded to mounting plate 31 of mast 10. Thus, gear teeth 83 of rack 82 interengage with teeth 88 of pinion 85 while the lower face 95 of rack 82 is in contact with and slides along mounting plate 31.

Interengaging with rack 82 is a gear segment 101. Gear segment 101 is keyed or otherwise mounted on journal portion 64 of pivot pin 65. Thus, rotation of gear segment 101 causes journal portion 64 to rotate within the corresponding pillow block opening 62 causing mast 10 to pivot about axis A. Gear segment 101 has an angular extent slightly greater than 9020 and has an outer arc-shaped surface 103 coaxial with axis A. Surface 103 includes gear teeth 105 interengaging with gear teeth 83 of rack 82. Gear segment 101 also includes radial surfaces 106 and 107 having corresponding radially outer and inner ends 109 and 110, respectively. Preferably, teeth 105 encompass an angle greater than 90° and preferably an angle of approximately 130°. However, radial surfaces 106 and 107 preferably have an included angle therebetween of 90°, whereby surfaces 106, 107 are perpendicular to one another. The shape of gear segment 101 allows rotation through 90, and thus pivoting of mast 10 through 90° while maintaining gear segment 101 within housing cover 32 in mechanical section 34.

Rack and pinion system 81 operates in the following manner. Motor 86 is activated and preferably draws power from the battery of emergency vehicle 11 in order that mast 10 pivots from its resting, generally horizontal position as shown in FIG. 3. Rotation of gearbox shaft 87 in the counter clockwise direction in FIG. 3 causes pinion 85 mounted thereon to drive rack 82 to the right in FIG. 3. Gear teeth 83 engage gear teeth 105 on gear segment 101 causing gear segment 101 and thus journal portion 64 to rotate in a counterclockwise direction. Such rotation of journal portion 64 causes mast 10 to pivot counterclockwise about axis A towards a vertical position. By deenergizing motor 86, the pivoting of mast 10 may be stopped at any tilt angle position between 0° and 90°. The interengagement between gear teeth 88 of pinion 85 and gear teeth 83 of rack 82 together with the interengagement of gear teeth 83 with gear teeth 105 of gear segment 101 keep mast 10 fixed at any tilt angle desired between 0° to 90°. The interengaging gear teeth provide the mechanical force necessary to keep mast 10 in the tilt angle position. The process described above is reversed in order to lower mast 10 to the generally horizontal position.

Figure 3A:
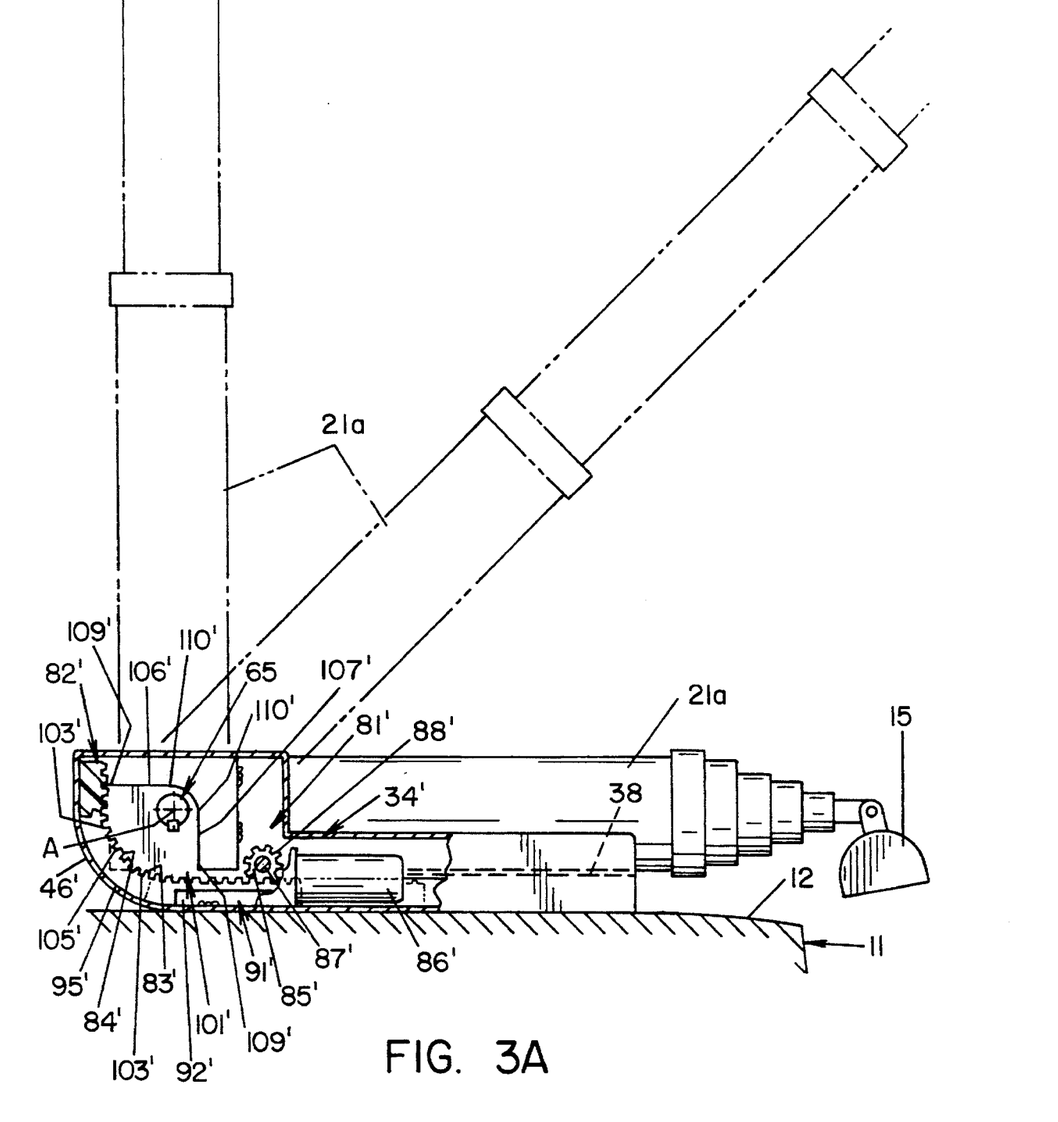
FIG. 3A is an elevation view partially in section and showing a modification of the telescoping mast shown in FIGS. 2 and 3.

In an alternative embodiment, as best shown in FIG. 3A, the rack and pinion system 81 of FIG. 3, and each of its components, is shown as rack and pinion system 81'. Rack and pinion system 81' is nearly identical to rack and pinion system 81 with the following modifications. Rack 82' is manufactured from a flexible material such as a plastic, in order that it is capable of bending and forming an arc. Track 91' has an arcuate shape defined by a radius having a center at axis A. Rack 82' includes gear teeth 83' along its upper face 84'. Transverse side wall 46' is also arc-shaped and forms the outer arc surface of track 91'. Rack and pinion system 81' operates like rack and pinion system 81, with the exception that gear teeth 83' at rack 82' interengage gear teeth 105' of gear segment 101' along 90° of the angular extent thereof. By increasing the interengaging surface area between gear segment 101' and rack 82', telescoping mast 10 can be more positively driven between its generally horizontal position at 0° and its generally vertical position at 90°. Further mast 10 is more securely maintained at any one of the selected angles between 0° and 90°. Thus, it is possible to provide a longer telescopic mast 10 or a heavier utility light 15 at upper mast end 16 of mast 10 since rack and pinion system 81' is capable of withstanding greater forces exerted thereon by an extended inclined mast 10. Further, as will be appreciated from FIG. 3A, rack and pinion system 81' is completely enclosed within mechanical section 34'.

Figure 6:
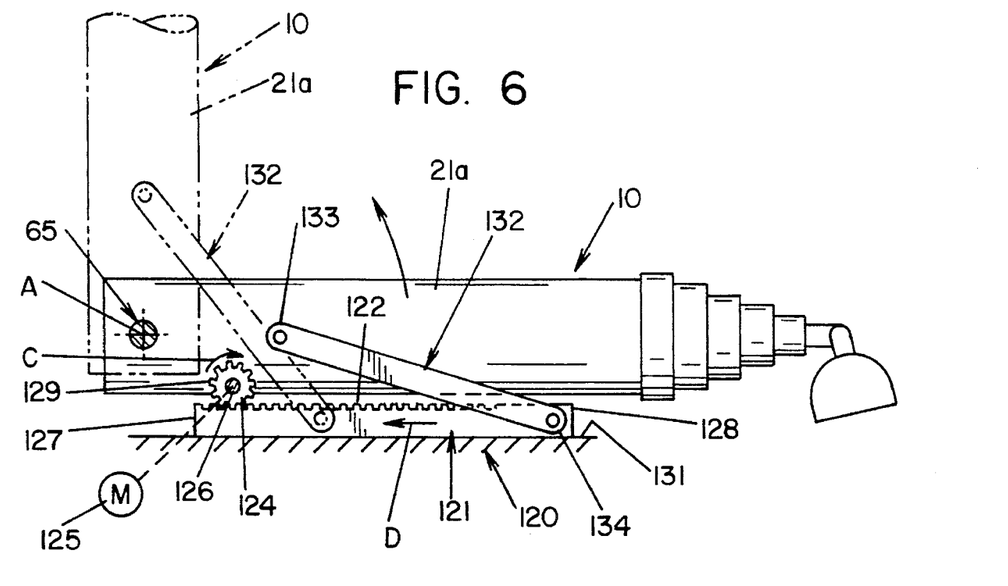
FIG. 6 is an elevation view of an alternative embodiment of a telescoping mast according to the invention.

FIG. 6 shows an alternative rack and pinion system 120. As shown, system 120 includes a rack 121 having gear teeth 122 on the upper face thereof for interengaging with gear teeth 129 of a pinion 124. A drive shaft 126 upon which pinion 124 is mounted is driven by a motor 125. Rack 121 slides within a track 131 similar to track 91 shown in FIGS. 2 and 3. Also included within rack and pinion system 120 is a lever arm 132 having a mast end 133 and a rack end 134. Mast end 133 is pivotally attached to section 21a of mast 10. Rack 121 has a first end 127 and a second opposite end 128. First end 127 is adjacent pivot pin 65 when mast 10 is in a generally horizontal position, and rack end 134 of lever arm 132 is pivotally attached to rack 121 adjacent second end 128.

As will be appreciated from FIG. 6, rack and pinion system 120 operates to raise mast 10 from its horizontal position by motor 125 driving shaft 126 and pinion 124 thereon in a clockwise direction as shown by the arrow C. Gear teeth 129 of pinion 124 interengage with gear teeth 122 of rack 121 to slide rack 121 within track 131 in the direction of arrow D. Since mast 10 is adapted to pivot about axis A in the manner shown in FIGS. 2 and 3, such sliding displacement of rack 121 causes lever arm 132 to pivot clockwise relative to the rack as rack end 134 approaches pinion 124. The lifting motion of lever arm 132 causes mast 10 to pivot counterclockwise about axis A and move from the generally horizontal position, or 0° position, through a plurality of angles to the generally vertical position, or 90° shown in phantom Lever arm 132 is also shown in phantom in this position. Interengagement between pinion 124 and rack 121 allows mast 10 to be securely maintained at any of a plurality of angles between the generally horizontal position and the generally vertical position shown in phantom. In order to lower mast 10, the elevating procedure is reversed.

Figure 7:
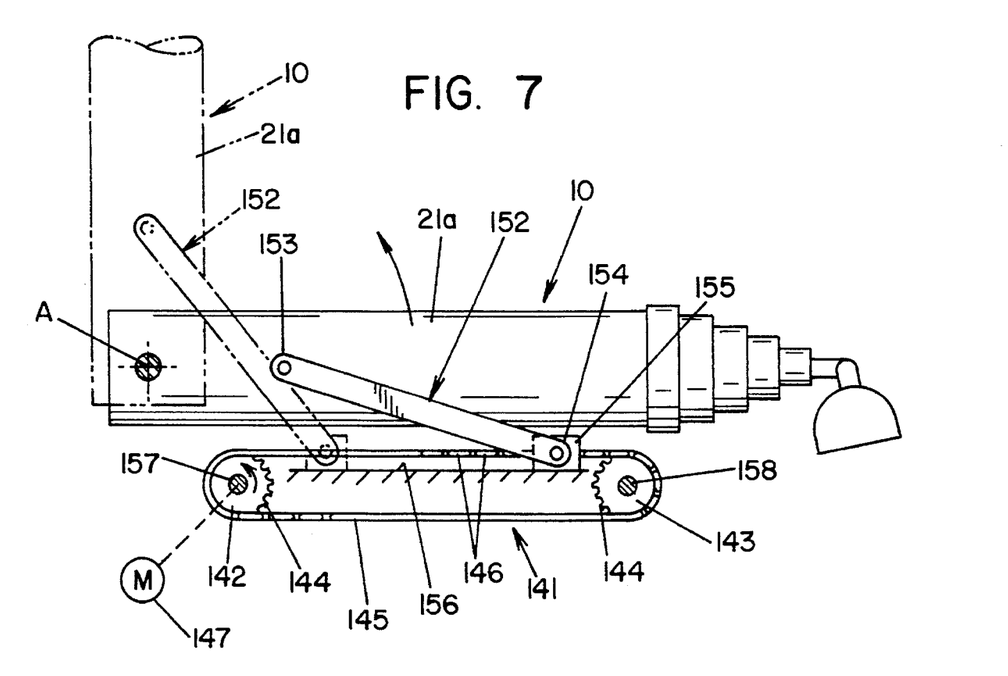
FIG. 7 is an elevation view of another embodiment of a telescoping mast according to the invention.

FIG. 7 shows another mechanical arrangement for pivoting mast 10 between a generally horizontal and a generally vertical position. The sprocket and chain system 141 of FIG. 7 is used for mechanically pivoting telescoping mast 10 about axis A. Sprocket and chain system 141 includes sprockets 142, 143 having sprocket teeth 144 for interengaging with chain 145 made up of individual chain links 146. Also included is a motor 147 adapted to drive sprocket 142, over which chain 145 is trained. Sprocket and chain system 141 also includes a lever arm 152 having a mast end 153 and a chain end 154. Attached to chain 145 is slide block 155. Lever arm 152 is pivotally attached at mast end 153 to telescoping mast section 21a adjacent pivot axis A, while chain end 154 is attached to slide block 155. Slide block 155 is slidably supported upon a generally smooth surface 156. As shown, the sprockets 142, 143 are rotatably supported by axles 157, 158, respectively, and chain 145 is engaged with sprocket teeth 144 of sprockets 142, 143 in a conventional manner.

Mast 10, as shown in the embodiment of FIG. 7 is pivoted from the horizontal to the vertical position thereof in the following manner. Motor 147, when activated, rotates axle 157 to turn sprocket 142 in a counterclockwise direction, whereby chain 145 is caused to turn in a counterclockwise direction. As chain 145 moves counterclockwise, slide block 155 moves along surface 156 causing lever arm 152 to assume the position as shown in phantom in FIG. 7. Mast 10 pivots about axis A as lever arm 152 lifts mast 10 from a generally horizontal position to a generally vertical position. Slide block 155 may be stopped at any point along surface 156 by deenergizing motor 147, whereby, mast 10 is securely maintained at any desired angle between 0° and 90°. Slide block 155 is compatible with surface 156 so that little friction is present as slide block moves along plate surface 156. It will be appreciated that the direction of the motor may be reversed causing sprocket 142 to rotate in a clockwise direction so that mast 10 is moved from its vertical or tilt angle position to a generally horizontal position or to some angle therebetween.

Figure 5:
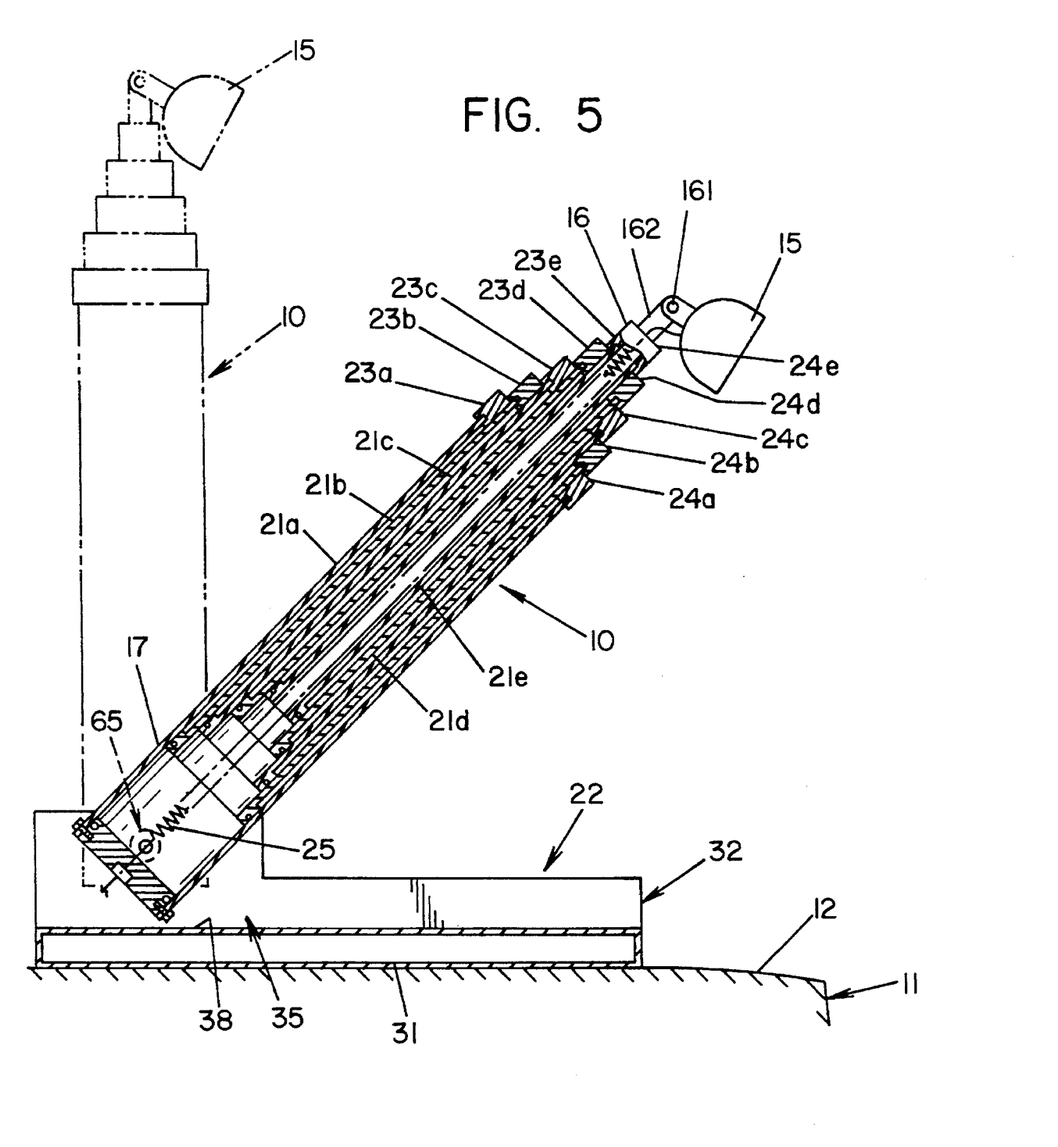

Preferably, as best seen in FIGS. 2, 3 and 5 telescoping mast 10 is provided with a pivotally mounted utility light 15. Such utility light 15 advantageously provides telescoping mast 10 with additional versatility to provide emergency lighting at the site where desired. Utility light 15 includes pivot pin 161 connecting light 15 to mast end section 162. Pivot pin 161 can be motor driven and remotely controlled in order that the light angle may be adjusted over the desired emergency access site. Utility light 15 may alternatively, or additionally, be provided with an electrical fixture, such as an electrical outlet connection for providing power to a remote access site.

The invention has been described with reference to the preferred embodiments. Obvious modifications and alterations will occur to others upon reading and understanding this specification. It is intended to include all such modifications and alterations in so far as they come within the scope of the appended claims.

Having thus described the invention, it is claimed:

1. In a pneumatically telescoping mast for mounting on the roof of a motor vehicle and supported for pivotal movement in opposite directions about a horizontal mast axis, said mast mounted on base plate means for removably affixing to said roof of said vehicle, said mast including adjacent telescoping sections slidable relative to one another between retracted and extended positions, means including pneumatic control means for displacing said mast sections between said retracted and extended positions, and means for pivoting said mast in opposite directions about said pivot axis between horizontal and vertical positions, the improvement comprising: said means for pivoting said mast between horizontal and vertical positions including drive wheel means, means for rotating said drive wheel means in opposite directions, and means including linkage means interconnecting said drive wheel means and said mast for rotation of said drive wheel means in one of said opposite directions to pivot said mast toward said vertical position and for rotation of said drive wheel means in the other of said opposite directions to pivot said mast toward said horizontal position, said drive wheel means including a pinion and said linkage means including rack means interengaging said pinion and reciprocal in opposite directions by said pinion wherein said means for pivoting is contained within a first housing on said base plate means adjacent said mast, said pneumatic control means is contained within a second housing on said base plate means adjacent said mast and opposite said first housing, said first housing and said second housing forming a channel therebetween, said mast mounted within said channel.

2. The telescoping mast of claim 1, said linkage means further including gear means fixed on said mast coaxial with said pivot axis and engaging said rack means for pivotal displacement in opposite directions about said axis in response to reciprocation of said rack means.

3. The telescoping mast of claim 2, wherein said rack means is linearly slidable relative to said pivot axis.

4. The telescoping mast of claim 2, wherein said rack means is flexible and supported for displacement about said pivot axis with said gear means.

5. The telescoping mast of claim 4, further including track means, and said rack means being slidably supported in said track means.

6. The telescoping mast of claim 5, wherein said track means has an arcuate portion coaxial with said pivot axis and said gear means has an outer arcuate surface, said arcuate portion of said track generally conforming in contour to said arcuate surface.

7. The telescoping mast of claim 2, wherein said gear means includes gear teeth having an angular extent of about 90° relative to said pivot axis.

8. The telescoping mast of claim 1, wherein said linkage means further includes a lever arm, said rack means being reciprocal in opposite directions by said pinion, and said lever arm having opposite ends pivotally attached one to said mast and the other to said rack means.

9. The telescoping mast of claim 8, wherein said one end of said lever arm is attached to said mast at a lever arm axis spaced from said pivot axis.

10. The telescoping mast of claim 9, wherein said mast includes an upper end portion and a lower end portion, said lower end portion being adjacent said pivot axis, said rack means including a first end and a second end, said first end being adjacent said pivot axis when said mast is in said horizontal position, said one end of said lever arm being attached to said mast at said lower end portion, and said other end of said lever arm being attached to said rack means adjacent said second end.

11. The telescoping mast of claim 8, wherein said drive wheel means includes motor means for rotating said pinion.

12. A pneumatically telescoping mast for mounting on the roof of a motor vehicle and adapted for supporting an electrical fixture, said mast mounted on base plate means for removably affixing to said roof of said vehicle, comprising means providing an axis about which said mast is adapted to pivot, said mast including adjacent telescoping sections slidable relative to one another between a retracted position and an extended position, means including pneumatic control means for pneumatically extending said mast from said retracted position to said extended position, and means for pivoting said mast between a generally horizontal position and a generally vertical position, said means for pivoting said mast including motor actuated drive means independently operable relative to said pneumatic control means, said drive means being movable in opposite directions, and means including linkage means interconnecting said drive means and said mast for movement of said drive means in one of said opposite directions to pivot said mast toward said vertical position and for movement of said drive means in the other of said opposite directions to pivot said mast toward said horizontal position, said drive means including a pinion having gear teeth and said linkage means including a rack means interengaging said gear teeth of said pinion and reciprocal in opposite directions by said pinion, said means for pivoting contained within a first housing on said base plate means, said pneumatic control means contained within a second housing on said base plate means.

13. The telescoping mast of claim 12, wherein said linkage means further includes gear means fixed on said mast coaxial with said pivot axis and engaging said rack means for pivotal displacement in opposite directions about said axis in response to reciprocation of said rack means.

14. The telescoping mast of claim 13, wherein said rack means is linearly slidable relative to said pivot axis.

15. The telescoping mast of claim 13, wherein said rack means is flexible and supported for displacement about said pivot axis with said gear means.

16. The telescoping mast of claim 15, further including track means, and said rack means being slidably supported in said track means.

17. The telescoping mast of claim 16, wherein said track means has an arcuate portion coaxial with said pivot axis and said gear means has an outer arcuate surface, said arcuate portion of said track generally conforming to said arcuate surface.

18. The telescoping mast of claim 13, wherein said gear means includes gear teeth having an angular extent of about 90° relative to said pivot axis.

19. The telescoping mast of claim 12, wherein said linkage means further includes a lever arm, said rack means being reciprocal in opposite directions by said pinion, and said lever arm having opposite ends pivotally attached one to said mast and the other to said rack.

20. The telescoping mast of claim 19, wherein said one end of said lever arm is attached to said mast at a lever arm axis spaced from said pivot axis.

21. The telescoping mast of claim 20, wherein said mast includes an upper end portion and a lower end portion, said lower end portion being adjacent said pivot axis, said rack means including a first end and a second end, said first end being adjacent said pivot axis when said mast is in said horizontal position, said one end of said lever arm being attached to said mast at said lower end portion, and said other end of said lever arm being attached to said rack means adjacent said second end.

22. The telescoping mast of claim 19, wherein said drive means includes motor means for rotating said pinion.

23. The telescoping mast of claim 12, wherein said first housing and said second housing form a channel therebetween, said mast mounted within said channel.

* * * * *